(12) United States Patent
Monk (10) Patent No.: US 7,885,198 B2
(45) Date of Patent: Feb. 8, 2011

(54) SYSTEMS AND METHODS FOR CHARACTERIZING PACKET-SWITCHING NETWORKS

(75) Inventor: John M. Monk, Monument, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 1402 days.

(21) Appl. No.: 10/751,723

(22) Filed: Jan. 5, 2004

(65) Prior Publication Data

US 2005/0147047 A1 Jul. 7, 2005

(51) Int. Cl.
*G01R 31/08* (2006.01)

(52) U.S. Cl. ............ 370/252; 709/224; 714/100; 706/6; 706/20; 706/38; 706/44

(58) Field of Classification Search ............ 370/241, 370/236, 250–252; 709/224; 707/100; 714/1; 706/2, 6, 15, 20, 33, 38, 40, 41, 44
See application file for complete search history.

(56) References Cited

U.S. PATENT DOCUMENTS

| | | | | |
|---|---|---|---|---|
| 6,578,021 B1 * | 6/2003 | Barillaud | | 706/20 |
| 6,639,900 B1 * | 10/2003 | Anstey et al. | | 370/254 |
| 6,691,120 B1 * | 2/2004 | Durrant et al. | | 707/100 |
| 6,735,579 B1 * | 5/2004 | Woodall | | 706/20 |
| 6,741,568 B1 * | 5/2004 | Barillaud | | 370/252 |
| 7,039,015 B1 * | 5/2006 | Vallone et al. | | 370/252 |
| 7,096,264 B2 * | 8/2006 | Bonney et al. | | 709/224 |
| 2002/0049720 A1 * | 4/2002 | Schmidt | | 707/1 |
| 2002/0144174 A1 * | 10/2002 | Nwabueze | | 714/1 |
| 2002/0186660 A1 * | 12/2002 | Bahadiroglu | | 370/248 |
| 2003/0131098 A1 * | 7/2003 | Huntington et al. | | 709/224 |
| 2004/0252646 A1 * | 12/2004 | Adhikari et al. | | 370/252 |

OTHER PUBLICATIONS

Dasgupta, D.; Brian, H., "Mobile security agents for network traffic analysis," DARPA Information Survivability Conference & Exposition II, 2001. DISCEX '01. Proceedings, vol. 2, No., pp. 332-340 vol. 2, 2001.*

* cited by examiner

*Primary Examiner*—Kwang B Yao
*Assistant Examiner*—Jeffrey M Rutkowski
(74) *Attorney, Agent, or Firm*—Matthew A. Pequignot; Pequignot + Myers LLC (57) ABSTRACT

A packet-network analyzer system for characterizing network conditions of a packet-network-under-test is provided. In this regard, one such system can be broadly summarized by a representative analyzer system that incorporates a data collection element to receive the raw digital data from a host analyzer, a data selection element to receive the raw digital data, a data processing element to process the selected data set to generate a normalized data set, a neural processing module to process the normalized data set to generate a set of rules and relationships, and a data mining module that uses the rules and relationships to generate a mined data set from the selected data set, the mined data set being used to characterize a packet-network-under test.

23 Claims, 5 Drawing Sheets

SYSTEMS AND METHODS FOR CHARACTERIZING PACKET-SWITCHING NETWORKS

BACKGROUND

Communication networks may be broadly classified under two distinct categories: circuit-switching networks and packet-switching networks. The public switched telephone network (PSTN) is an example of a circuit-switching network, while the Internet is an example of a packet-switching network. Other examples of packet-switching networks include a PC local area network (LAN) and a corporate wide-area network (WAN).

Packet-switching networks employ a multitude of protocols, including transport protocols such as Transport Control Protocol/Internet Protocol (TCP/IP) and Ethernet; as well as language protocols such as Hypertext markup language (HTML) and Extensible markup language (XML). While the power of a packet-switching network, such as the Internet, lies in its adaptability to heterogeneous applications using a variety of formats and protocols to transport data packets, this heterogeneous approach proves to be a challenge in terms of characterizing the transport qualities of the various subnets that constitute the overall network. A part of this challenge arises from errors that are generated in the process of translating formats related to a data packet that originates from one end of a packet-switching network and is transported over multiple network links before arriving at its destination.

As an example of such a process, a PC may originate an Ethernet-formatted data packet that is transported over a LAN to a webserver, wherein the webserver extracts the data packet and reformats it as an IP packet that is transported over a TCP link. This TCP link may incorporate an intermediate link that uses an Asynchronous Transfer Mode (ATM) format. When this occurs, the TCP/IP data packet has to be translated into the ATM format, which may subsequently be carried over a fiber-optic link requiring the ATM cells to be further translated into a format such as synchronous optical network (SONET). At the receiving end, the SONET, ATM, and TCP/IP formats have to be suitably converted to a format that the receiving device, such as a PC, can utilize to extract the originally transmitted data packet. This process of format-translations typically leads to errors in the received data packet due to transmission defects in devices, and faults in the transmission links of one or more intermediate networks.

Troubleshooting an end-to-end packet-switching network path to identify such a faulty intermediate network is a daunting task involving format-translations and measurements of various parameters. This task is further exacerbated by the sheer volume of data packets being carried over the intermediate networks in the packet-switching network. Processing such a large volume of digital data, to identify a transmission fault, especially one that occurs infrequently, typically turns out to be an imprecise exercise.

The power of large packet-switching networks such as the Internet also lies in its capacity to provide alternative transmission paths when a failure occurs in a transmission link that is currently in use. This failure may occur, for example, due to a hardware failure in a router, or due to traffic congestion from an excessive flow of data bits through a packet switching node. Unlike a fixed end-to-end transmission link the performance of which may be characterized with a certain degree of reliability, the introduction of alternative switching paths makes the task of such network characterization even harder. For example, if a particular switched path has a measurable bit-error-rate (BER) over a certain period of time, the BER may change for the same switched path during a subsequent interval of time. If an alternative switched path is now introduced, the BER of the alternative switched path may be different from that of the previously used one, and also subject to change over time with no clear correlation of the new BER values to the BER values measured earlier upon the previous path.

Therefore, while characterization of a fixed end-to-end transmission link is in itself a difficult task, this characterization becomes more complicated and unreliable when alternative switching paths are introduced. A network analyzer using a fixed threshold for measuring the BER performance of such a packet-switching network may prove inadequate in characterizing the packet-switching network when using such a measuring technique. As such, it is desirable to provide network characterization solutions that can adapt to changing network parameters and measure transmission parameters that can be used to accurately define network conditions.

SUMMARY OF THE INVENTION

The present invention generally relates to packet-network characterization. More specifically, the invention relates to characterizing network conditions of a packet-network-under-test, using neural network techniques to analyze raw digital data that has traversed a heterogeneous packet network. In this regard, one such system can be broadly summarized by a representative analyzer system that incorporates a data collection element to receive the raw digital data from a host analyzer, a data selection element to generate a selected data set from the raw digital data, a data processing element to process the selected data set to generate a normalized data set, a neural processing module to process the normalized data set to generate a set of rules and relationships, and a data mining module that uses the rules and relationships to generate a mined data set from the selected data set, the mined data set being used to characterize a packet-network-under-test.

DESCRIPTION OF THE DRAWINGS

The components in the drawings are not necessarily drawn to scale. Moreover, in the drawings, like reference numerals designate corresponding parts throughout the several views.

DETAILED DESCRIPTION

Reference will now be made in detail to the description of several embodiments as illustrated in the drawings. While being described in connection with these drawings, there is no intent to limit it to the embodiment or embodiments disclosed therein. On the contrary, the intent is to cover all alternatives, modifications and equivalents included within the scope of the invention as defined by the appended claims.

While various solutions exist to reduce the impact of issues related to using a variety of formats over a packet network such as the Internet, one solution that may be employed currently uses extensible markup language (XML) as a language protocol. XML, which is derived from SGML, allows flexible development of user-defined documents, and a robust mechanism for transmitting data across the Internet. Such data may include files containing telemetry data related to various measurements carried out upon devices and networks located at a remote distance from a central monitoring or analyzing unit.

In relationship to packet networks, telemetry involves capturing a large quantity of digital data at a remote location, transmitting it across one or more packet networks, and receiving it at one or more data analyzer locations. Analyzing such a large quantity of digital data to extract useful information related to the characteristics of the telemetered device or network depends on the nature of the information to be extracted. For example, in one case, the BER of one or more data packets carried over a remote network may be used to characterize the transmission quality of the remote network, while in a second case the header information contained in one or more ATM cells may be used characterize a transmission link.

When BER is used for characterization, a data analyzer may set a threshold BER value as a pass/fail yardstick to report a failure when the telemetered BER exceeds this preset value. If the BER of the telemetered remote network is of a variable nature that depends on various times and conditions of the remote network, setting such a fixed threshold BER value may prove inadequate to verify the transmission characteristics of the remote network. Conditions that lead to a variable BER, include the potential multiplicity of alternative data paths that a data packet may have to traverse over a packet network such as the Internet.

Unlike prior-art solutions that are inefficient due to the use of substantially unchanging threshold values in error-analysis of data packets that have traversed a heterogeneous packet network, the present invention incorporates neural network techniques to identify and use adaptable error threshold values. Such neural network techniques include algorithms that learn and adapt to non-obvious behavioral patterns in large quantities of data.

While the format issue is addressed by the use of XML in the preferred embodiment, the issue of network characterization is addressed by using neural network technologies in the data analyzers, as will be elaborated in further detail by describing the figures in the following paragraphs.

Figure 1:
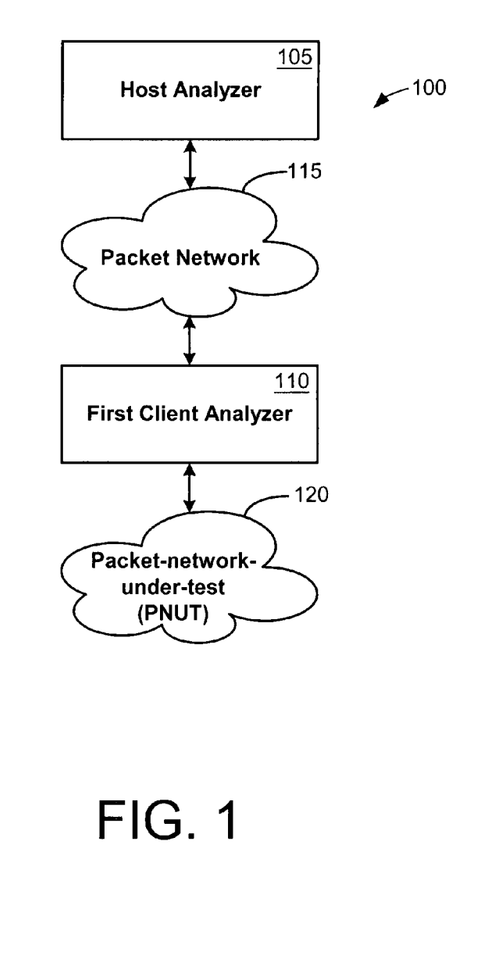
FIG. 1 shows an embodiment of a packet-network analyzer system incorporating a host analyzer connected to a first client analyzer that is connected to a packet-network-under test (PNUT).

FIG. 1 shows an embodiment of a packet-network analyzer system 100 incorporating a host analyzer 105 connected to a first client analyzer 110 that is connected to a packet-network-under test (PNUT) 120. PNUT 120 is a generic representation of various types of packet-switching networks such as the Internet, a WAN, a LAN, or a subnet of the Internet. PNUT 120 may incorporate various types of network elements such as a PC, a switch, a router, a digital loop carrier (DLC), and transmission links that may include twisted-pair wires, co-axial cables, fiber-optic links, wireless links, and cellular links.

First client analyzer (FCA) 110, which is connected to PNUT 120, may be implemented in several ways, using several types of devices incorporating hardware and software configurations. FCA 110 may be a dedicated test equipment configured with acquisition hardware and software tailored to interface, collect and process raw digital data from PNUT 120. Alternatively, FCA 110 may be a device such as a packet switch, a router, a digital subscriber loop access multiplexer (DSLAM), or a DLC that has been configured to implement the analyzer functionality.

Packet network 115 is a generic representation of various types of packet-switching networks such as the Internet, a WAN, a LAN, or the PSTN. Packet network 115 incorporates network elements such as switches, routers, DLCs, and transmission links. Transmission links include twisted-pair wires, co-axial cables, fiber-optic links, wireless links, and cellular links.

Host analyzer 105 communicates with FCA 110 through packet network 115, and receives the raw digital data transmitted by FCA 110. Similar to FCA 110, host analyzer 105 may be implemented in several ways, using several types of devices incorporating hardware and software configurations. It incorporates neural network analysis and data mining techniques that will be explained further with reference to other figures. Communication between host analyzer 105 and FCA 110 is carried out using a uniform resource locator (URL) process. This process will be understood by the following description that provides an exemplary method for host analyzer 105 to obtain test data related to PNUT 120.

A unique URL that is associated with this test data collection process is provided to the host analyzer 105 as well as FCA 110. Host analyzer 105 uses this URL to establish a hyper text transport protocol (HTTP) connection to FCA 110. The host analyzer 105 then transmits to FCA 110 a 'start measurement' request document. Upon receiving this document, FCA 110 verifies the authenticity of the request before processing the document to obtain test-related guidelines. These guidelines include various parameters such as measurement procedures and types of measurement to be carried out. FCA 110 then transmits a second URL information to host analyzer 105. The host analyzer 105 issues a 'get' command, and uses this second URL to open a data connection between host analyzer 105 and FCA 110.

FCA 110 collects test data and/or traffic data from PNUT 120 by using suitable hardware and software such as line interfaces, transport protocols, and measurement tools. Measurement tools include for example, test software, test units, and test probes that are connected into PNUT 120. The test/traffic data is then transported by FCA 110 to host analyzer 105 using an XML transmission format. After the relevant data is collected and stored by host analyzer 105, the host analyzer 105 issues a stop measurement document using XML, that is transmitted to FCA 110. The test transaction is thus terminated. Host analyzer 105 may use a similar process to access data from other PNUTs that are connected to other client analyzers. It will be understood that FCA 110 may analyze/process traffic data from PNUT 120 to generate test data, before transmitting the test data to host analyzer 105. Alternatively FCA 110 may act as a conduit for transmission of traffic data from PNUT 120 directly to host analyzer 105.

Figure 2:
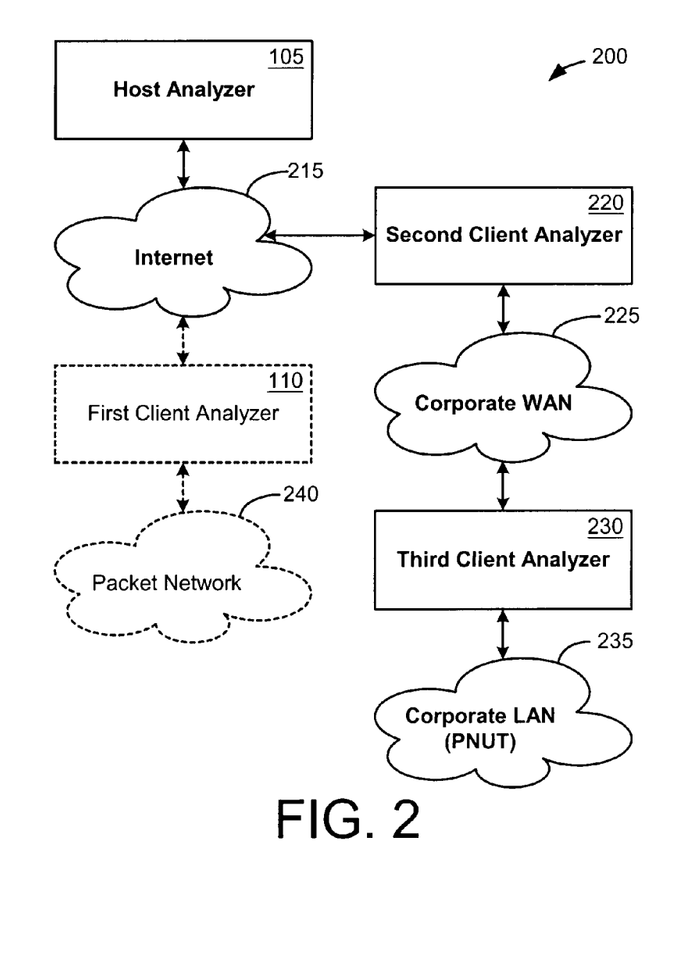
FIG. 2 shows another embodiment of a packet-network analyzer system incorporating a host analyzer connected to a first client analyzer and a second client analyzer. Additionally, a third client analyzer that is connected to the PNUT is also connected to the second client analyzer.

FIG. 2 shows another embodiment of a packet-network analyzer system 200 to characterize the transmission parameters of a PNUT 235. PNUT 235 is shown in this figure as a corporate LAN whose transmission parameters are to be characterized in host analyzer 105. Similar to FCA 110, which was described with reference to FIG. 1, third client analyzer (TCA) 230 interfaces into PNUT 235. A second client analyzer (SCA) 220 is used to receive the raw-digital data that was acquired by TCA 230 and transmitted through corporate WAN 225. SCA 220 then transmits this raw digital data to host analyzer 105 through Internet 215. Internet 215 is one example of the generic packet network 115 of FIG. 1. The communication between host analyzer 105 and third client analyzer 230 is carried out using a URL-oriented communication setup similar to that described with reference to host analyzer 105 and first client analyzer 110 of FIG. 1. In this example application, the second client analyzer 220 acts as network element that does not necessarily provide any packet network related testing functions associated with host analyzer 105.

It will be noted that PNUT 120 of FIG. 1 is shown re-labeled as packet network 240 in FIG. 2, because this network is not designated in this particular example as the packet-network-under-test.

Figure 3:
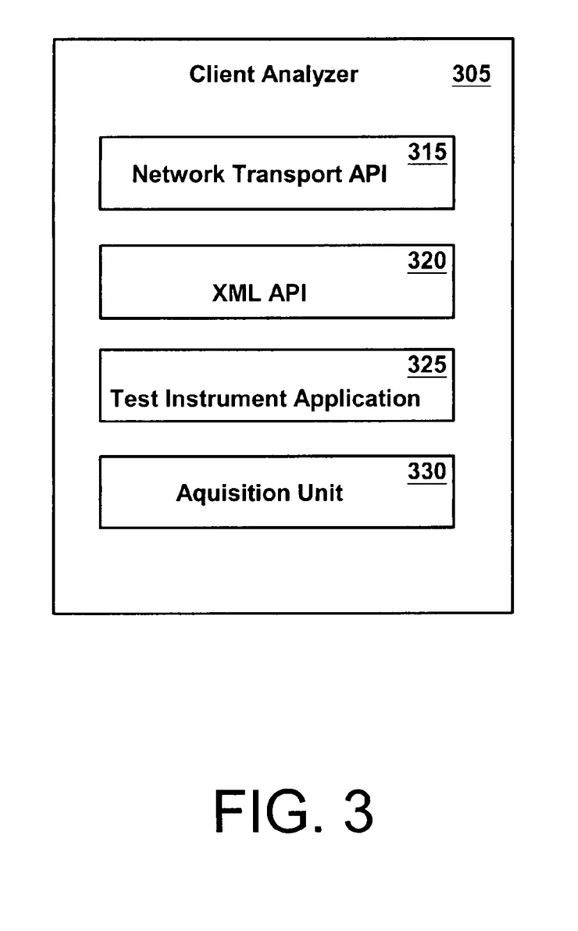
FIG. 3 illustrates a few components of a client analyzer used in a packet-network analyzer system such as those of FIGS. 1 and 2.

FIG. 3 illustrates a few components of a client analyzer 305 used in a packet-network analyzer system such as those of FIGS. 1 and 2. Client analyzer 305 was referred to with specific labels such as first client analyzer, second client analyzer, and third client analyzer in FIGS. 1 and 2, these specific labels being used to describe the operation of client analyzers in those particular configurations.

Client analyzer 305 typically contains acquisition unit 330, which is a hardware and/or software implementation used to collect raw digital data from a PNUT, such as PNUT 120 of FIG. 1. One example element contained inside a PNUT which may be used to provide the raw digital data to the acquisition unit 330 is a router with an assigned uniform resource locator (URL). Client analyzer 305 uses this URL, together with mechanisms such as HTTP and XML to communicate with the router to obtain the raw digital data. Client analyzer 305 contains test instrument application 325, in hardware and/or software form, to perform some processing and formatting functions upon the raw digital data before utilizing an Application programming interface (API) such as XML API 320 to format the raw digital data for transmission by the Network transport API 315. Network transport API 315 may use HTTP to transport the XML-formatted data received from XML API 320, to a packet network such as packet network 115 (FIG. 1), corporate WAN 225 (FIG. 2), or Internet 215 (FIG. 2).

Figure 4:
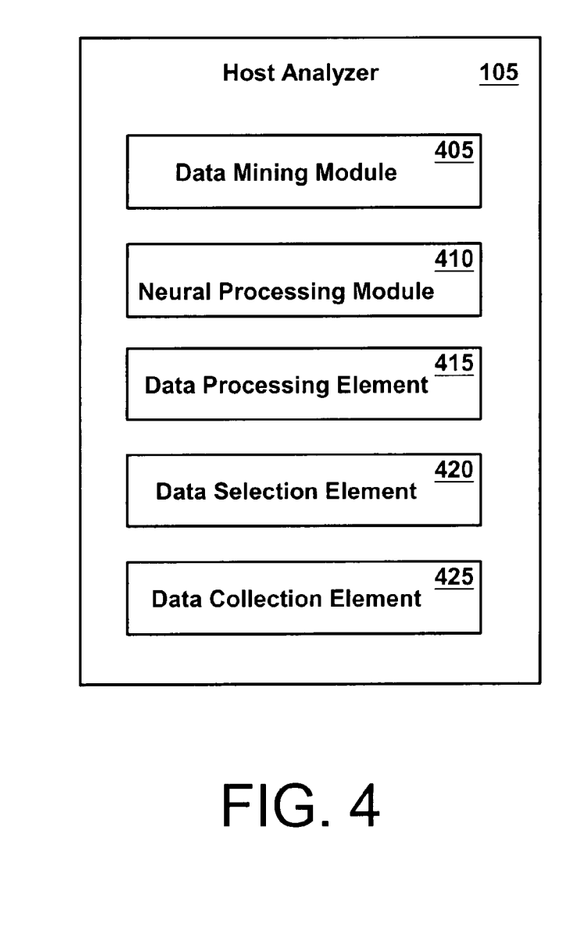
FIG. 4 illustrates a few components of a host analyzer used in a packet-network analyzer system such as shown in FIGS. 1 and 2.

FIG. 4 illustrates a few components of the host analyzer 105 used in a packet-network analyzer system such as shown in FIGS. 1 and 2. Data collection element 425 provides an interface for host analyzer 105 into a packet network, such as packet network 115 (FIG. 1) or Internet 215 (FIG. 2). Upon receiving raw digital data in a format such as XML over HTTP from the packet network, the Data Collection Element 425 extracts the raw digital data and provides this data to the Data Selection Element 420. The Data Selection Element 420 selects a subset of the raw digital data for processing in the Data Processing Element 415. The selection of a subset is based upon one or more parameters of a PNUT that are used to characterize the transmission parameters of the PNUT. Such parameters include BER, CRC-errors, bandwidth, data throughput rates, congestion parameters, data buffer parameters, number of hops, latency, hardware failures, and quality-of-service parameters.

The data processing element 415 receives the selected subset of the raw digital data, and operates upon this subset to carry out functions such as filtering and normalization. The filtering function, which is one of several functions, may be carried out to improve the analysis efficiency by rejecting undesirable data bits in the selected subset. Normalization is typically implemented to accommodate a wide range of dynamic values that may occur when selected subsets of data are obtained from multiple sources. For example, with reference to FIG. 2, host analyzer 105 may receive raw digital data from FCA 110 for characterizing packet network 240, and also raw digital data from SCA 220 for characterizing corporate WAN 235. If the parameter of interest in the raw digital data is the dropped packet rate, which as an example, may be 20 dropped bits in a million bits from FCA 110 and 600 dropped bits per kilobits from SCA 220, the two parameters may be converted into a common "normalized" rate of dropped bits per kilobit, if such a rate is preferable for processing in the neural processing module 410.

In more general terms, the normalization process specifies a lower bound and an upper bound of values for the parameter of interest in the subsets of data, such subsets having been received from one or more PNUTs that require characterization.

Neural processing module 410 accepts the normalized subset of the raw digital data from data processing element 415 as its training input from which non-obvious pattern sequences are to be identified, before extracting one or more rules and relationships information. The extraction process uses neural network algorithms that glean information by fast adaptation and learning techniques. Neural processing module 410 will be explained in further detail using FIG. 6.

Data mining module 405 accepts the rules and relationships information from neural processing module 410 and applies it to the selected subset of the raw digital data, to carry out a data mining operation. The results of the data mining operation, which may be generated using information derived from traffic data that is routed to the host analyzer by a client analyzer, provide network characterization information of the packet-network-under-test. While data mining module 405 is shown in FIG. 4 as contained inside the host analyzer 105, in alternative embodiments the data mining process may be carried out in systems that are located external to the host analyzer 105.

Neural processing module 410 together with data mining module 405, provides a system that learns and stores performance patterns related to a PNUT over various periods of time, thereby enabling dynamic network characterization under varying traffic error conditions, such error conditions being largely undetectable by prior art solutions. One example of such an error condition may be an application layer problem caused by a broadcast storm in the packet network. This problem may manifest itself in the form of poor response time from a web server. In such a situation, host analyzer 105, obtains test data and/or traffic data from one or more network segments associated with the PNUT, using one or more client analyzers. This data is then analyzed using the rules and relationships information generated earlier in data mining module 405 to check for any deviations from 'normal' behavior. For example, if it is observed that the current bit-error rate, or average jitter, along a certain network segment of the PNUT is higher than what was observed earlier in generating the rules and relationships information, host analyzer 105 can identify which particular network element of the PNUT is the most likely contributor of the error condition.

Figure 5:
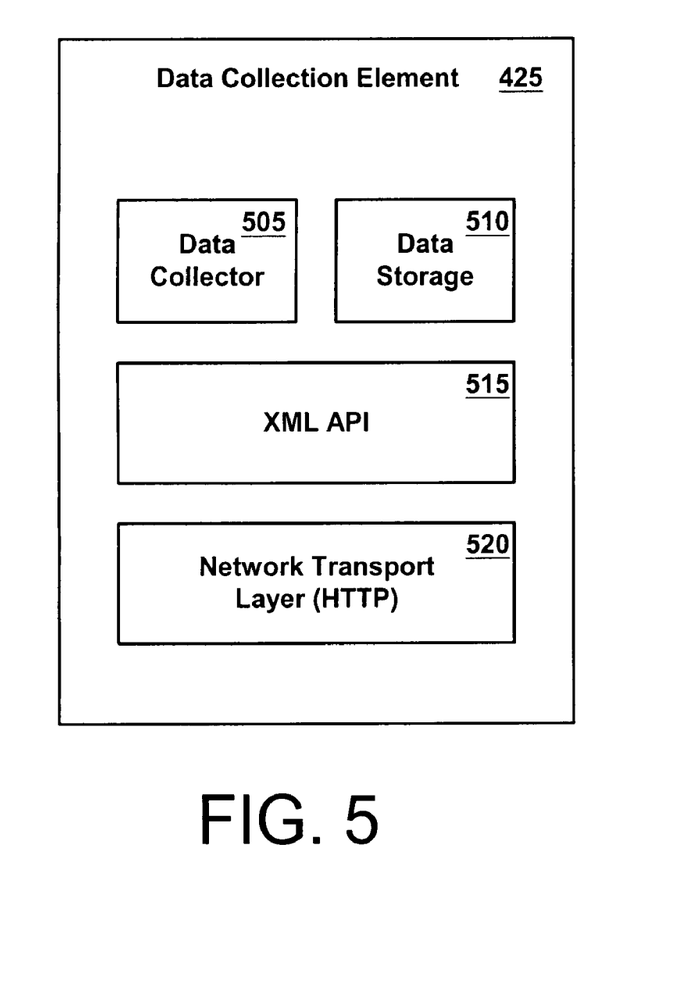
FIG. 5 illustrates a few components of the data collection element used in a packet-network analyzer system such as shown in FIGS. 1 and 2.

FIG. 5 illustrates a few components of the data collection element 425 used in a packet-network analyzer system such as shown in FIGS. 1 and 2. While several embodiments may be used to implement the functionality of the data collection element 425, FIG. 5 shows one exemplary implementation using XML over HTTP as a physical layer interface. It will be understood that there are several alternatives which may be used in place of the HTTP format, as well as alternative languages in place of XML. With reference to FIG. 1, network transport layer 520 (not shown) is contained inside a data collection element 425 (not shown) that is part of host analyzer 105. The network transport layer 520 provides an interface for collecting raw digital data from a client located in the packet network 115.

In an example of a data collection process, the client, such as a router, will typically incorporate a URL to which the data collection element 425 will establish a HTTP connection. Once this connection is established, the client sends an XML document with a user name and password. After an authentication routine is carried out, the data collection element 425 parses the received XML document to retrieve the raw digital data, which is then stored in data storage 510. The raw digital data stored in data storage 510 may then be accessed by data selection element 40 (shown in FIG. 4).

Figure 6:
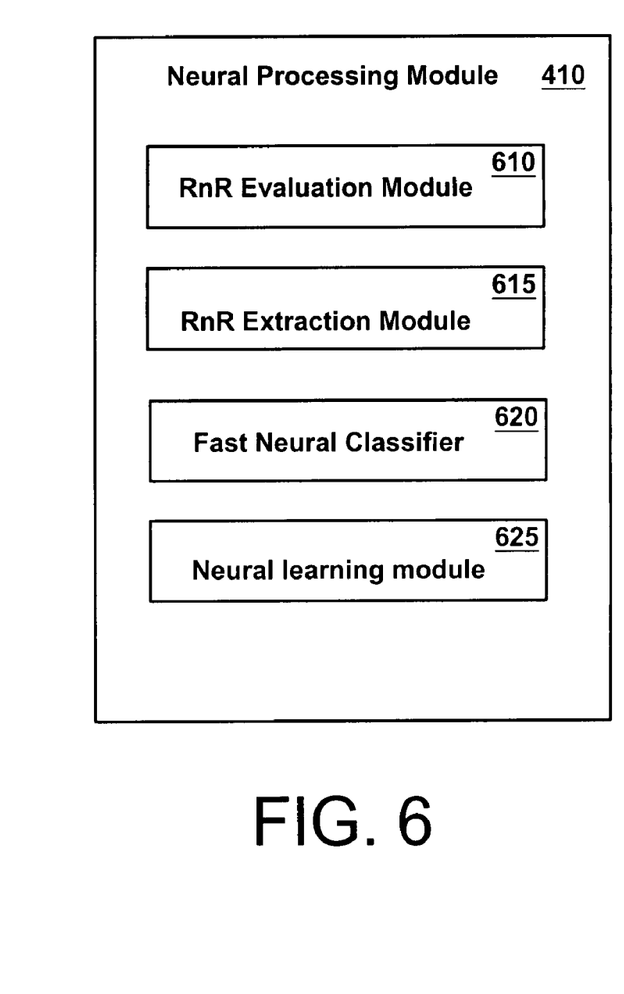
FIG. 6 illustrates a few components of the neural processing module used in a packet-network analyzer system such as shown in FIGS. 1 and 2.

FIG. 6 illustrates a few components of the neural processing module 410 used in a packet-network analyzer system such as shown in FIGS. 1 and 2. Neural learning module 625, together with the fast neural classifier 620, uses a neural learning algorithm to create a network of neurons, wherein the connection paths between the neurons, typically configured in a multi-layer structure, provide the information used by other blocks of the neural processing module 410. One example of a neural learning algorithm utilizes adaptive resonance theory (ART) and derivatives of ART. An ART architecture provides a stable process for learning a recognition code from an arbitrary sequence of binary input patterns. In such an architecture, the input patterns are encoded by changing connection weights between neurons that constitute, for example, a first layer and a second layer. The neurons contained in the second layer and higher layers are dynamically appended as part of a training process in the neural learning module 625 and the fast neural classifier 620.

RnR (Rules and Relationships) extraction module 615 examines the input data provided to the neural learning module 625 and the output data from the fast neural classifier 620 to extract a relationship between the inputs and output neurons of the generated neural network. This extraction process can be carried out using different methods. One such method is a modified Chi-squared automatic interaction detector (CHAID) method. In this method, the neural network characteristics and behavior are partitioned into different segments depending upon various input criteria. The process may be broadly described as using the Chi-squared calculation to segment and cross tabulate a dependent variable with several predictor variables to identify the strongest, most statistically significant relationships. This step is followed by further cross tabulating to produce smaller and more refined segments, until a specified minimum size segment is achieved.

RnR evaluation module 610 assesses the rules extracted from the RnR extraction module 615 for correctness, usefulness and comprehensibility. The extracted rules may be fed back into the RnR extraction module 615, and is also provided to the data mining module 405 of FIG. 4.

Figure 7:
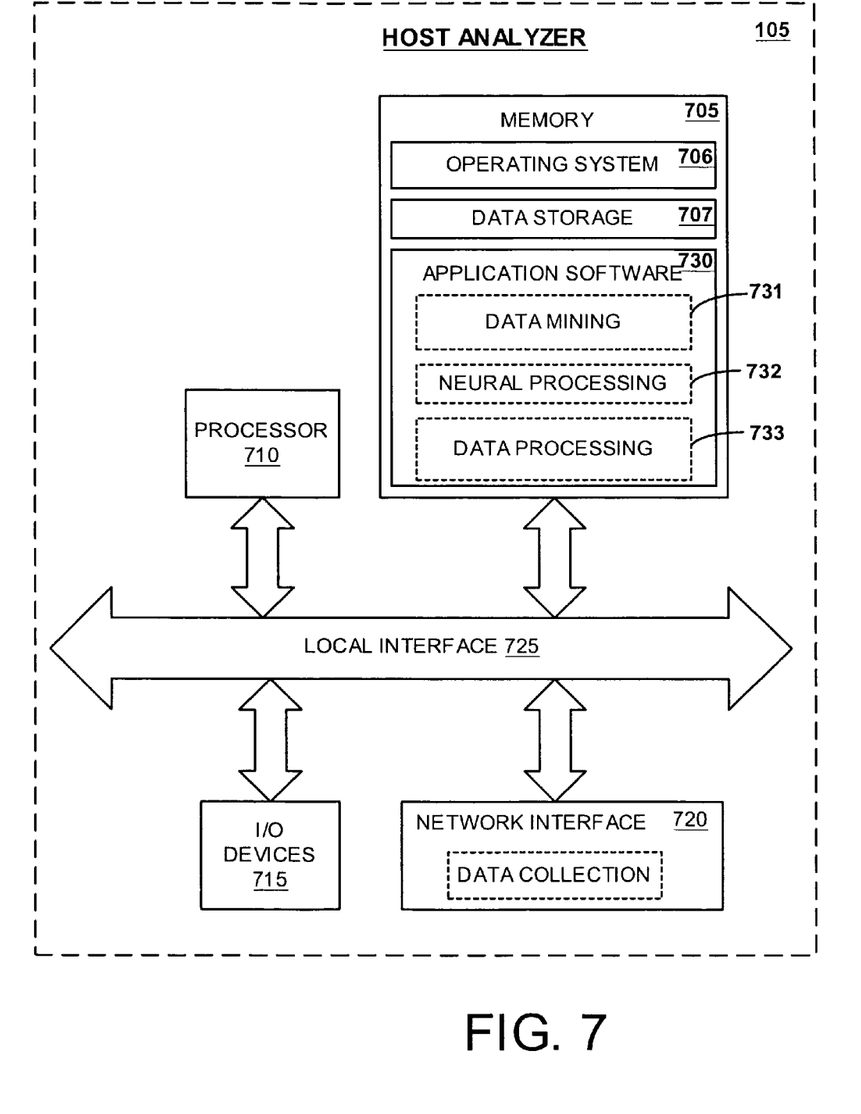
FIG. 7 shows an exemplary embodiment of the host analyzer of a packet-network analyzer system implemented in a computer system.

FIG. 7 shows an exemplary embodiment of the host analyzer 105 of a packet-network analyzer system implemented in a computer system. The host analyzer 105 of FIG. 7 incorporates hardware as well as software elements.

Generally, in terms of hardware architecture, the host analyzer 105 of FIG. 7 includes a processor 710, memory 705, one or more input and/or output (I/O) devices 715 (or peripherals), and network interface 720 that are communicatively coupled via a local interface 725. The local interface 725 can be, for example but not limited to, one or more buses or other wired or wireless connections, as is known in the art. The local interface 725 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 710 is a hardware device for executing software, particularly that stored in memory 705. The processor 710 can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions.

The memory 705 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 705 may incorporate electronic, magnetic, optical, and/or other types of storage media. Note that the memory 705 can have a distributed architecture, where various components are situated remote from one another, but can be accessed by the processor 710.

When the host analyzer 105 is in operation, the processor 710 is configured to execute software stored within the memory 705, to communicate data to and from the memory 705, and to generally control operations of the host analyzer 105 pursuant to the software.

The software in memory 705 may include one or more separate programs, each of which comprises an ordered listing of executable instructions for implementing logical functions. In the example of FIG. 7, the software in the memory 705 includes application software 730 that implements the host analyzer system, data storage 707, and an operating system 706. The elements shown inside application software 730 and the data collection element shown inside network interface 720 are functionally equivalent to the respective blocks that were described with reference to the host analyzer system 105 of FIG. 4.

It should be noted that the application software 730 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Application software 730 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the host analyzer 105 is implemented in hardware, the host analyzer 105 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 8:
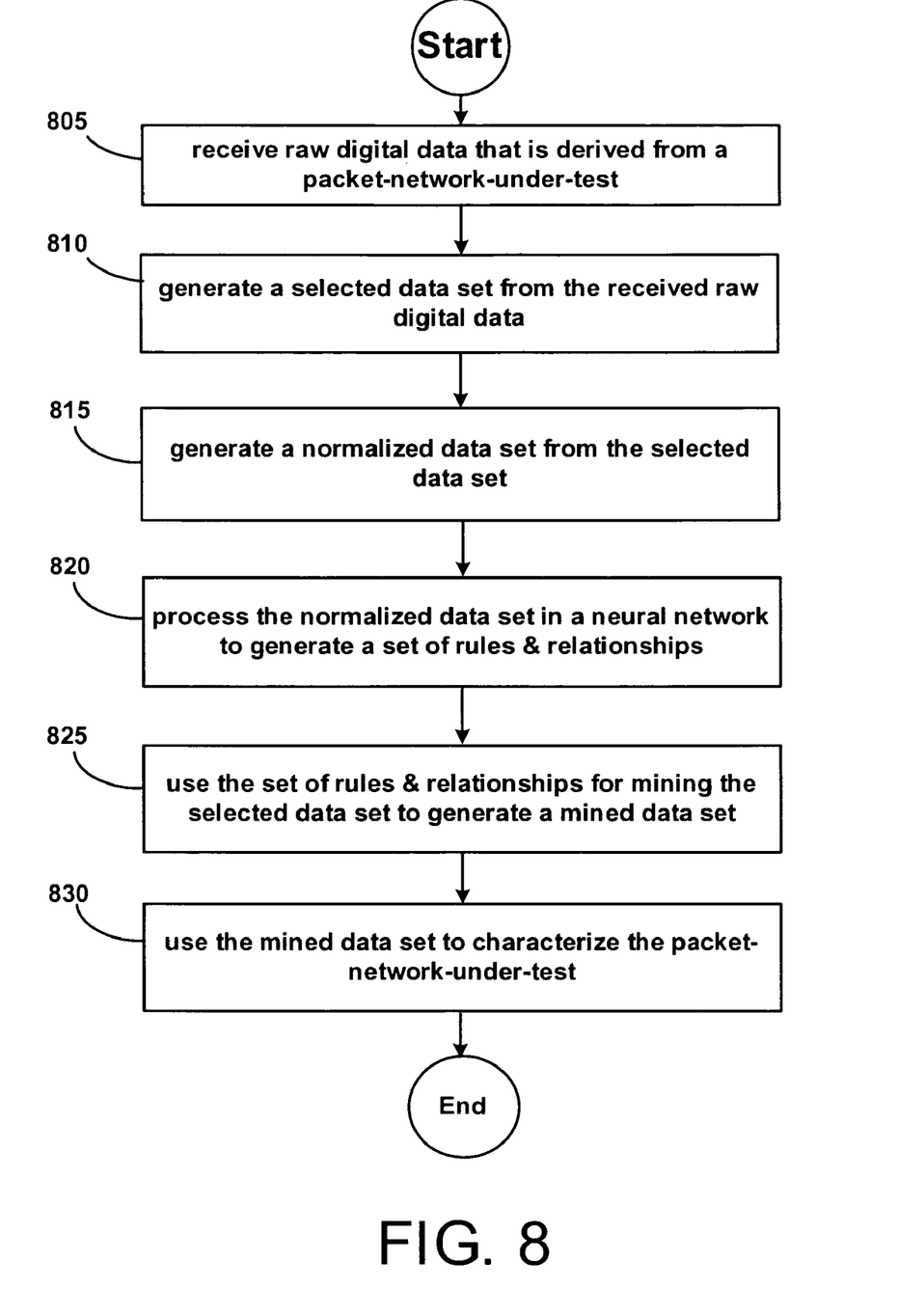
FIG. 8 is a flow-chart of an embodiment of a method for analyzing a packet-network-under-test.

FIG. 8 is a flow-chart of an embodiment of a method for analyzing a packet-network-under-test. In block 805, raw digital data derived from the PNUT is received in a host analyzer. A selected data set is then generated from the received raw digital data, in block 810. From this selected data set, a normalized data set is generated in block 815. The normalized data set is processed in a neural network, to generate a set of rules and relationships (Block 820). The set of rules and relationships is applied to the selected data set to generate a mined data set (Block 825), and the mined data set is used to characterize the PNUT.

The above-described embodiments are merely set forth for a clear understanding of the principles of the invention. Many variations and modifications may be made. All such modifications and variations are included herein within the scope of this disclosure and protected by the following claims.

What is claimed is:

1. A method for analyzing a packet-network-under-test, comprising:
   receiving raw digital data that is derived from a packet-network-under-test;
   generating a selected data set from the received raw digital data;
   generating a normalized data set from the selected data set;
   processing the normalized data set in a neural network to generate a set of rules and relationships;
   using the set of rules and relationships for mining by a host analyzer the selected data set to generate a mined data set; and
   using the mined data set to characterize the packet-network-under-test.

2. The method of claim 1, wherein the step of receiving raw digital data incorporates the use of XML over HTTP as a transmission protocol.

3. The method of claim 2, wherein the normalized data set is generated using ART, and the set of rules and relationships is generated using a modified CHAID scheme.

4. The method of claim 3, wherein characterizing the packet-network-under-test comprises generating a performance metric of transmission of data packets through the packet-network-under-test.

5. The method of claim 4, wherein the packet-network-under-test is an IP network.

6. The method of claim 4, wherein the packet-network-under-test is a subnet of the Internet.

7. A packet-network analyzer system stored on a computer-readable storage device selected from the group consisting of a portable computer diskette, a random access memory, a read-only memory, an erasable programmable read-only memory, and a portable compact disc read-only memory, the analyzer comprising:
   logic configured to receive raw digital data that is derived from a packet-network-under-test;
   logic configured to generate a selected data set from raw digital data of the packet-network-under-test;
   logic configured to generate a normalized data set from the selected data set;
   logic configured to process the normalized data set in a neural network to generate a set of rules and relationships;
   logic configured to use the set of rules and relationships for mining the selected data set to generate a mined data set; and
   logic configured to use the mined data set to characterize the packet-network-under-test.

8. The analyzer system of claim 7, wherein the logic configured to receive raw digital data incorporates the use of XML over HTTP as a transmission protocol.

9. The analyzer system of claim 8, wherein the logic configured to generate the normalized data set uses ART, and the logic configured to process the normalized data set in the neural network uses a modified CHAID scheme.

10. The analyzer system of claim 9 wherein the logic configured to receive raw digital data incorporates logic to interface to the Internet.

11. A packet-network analyzer system stored on a computer-readable medium, the analyzer comprising:
    means for receiving raw digital data that is derived from a packet-network-under-test;
    means for generating a selected data set from raw digital data of the packet-network-under-test;
    means for generating a normalized data set from the selected data set;
    means for processing the normalized data set using a neural network to generate a set of rules and relationships;
    means for using the set of rules and relationships for mining the selected data set to generate a mined data set; and
    means for using the mined data set to characterize the packet-network-under-test.

12. The analyzer system of claim 11, wherein the means for receiving raw digital data incorporates the use of XML over HTTP as a transmission protocol.

13. The analyzer system of claim 12, wherein the means for generating the normalized data set uses ART, and the means for processing the normalized data set using the neural network uses a modified CHAID scheme.

14. The analyzer system of claim 13, wherein the means for receiving raw digital data incorporates means to interface to the Internet.

15. A packet-network analyzer system comprising a host analyzer communicatively coupled to a first client analyzer, wherein the host analyzer incorporates a neural processing module to process raw digital data provided to the host analyzer by the first client analyzer for characterizing a packet-network-under-test that is connected to the first client analyzer, the host analyzer comprising:
    a data collection element that receives the raw digital data from the first client analyzer;
    a data selection element that generates a selected data set from the raw digital data;
    a data processing element that processes the selected data set to generate a normalized data set;
    wherein the neural processing module that processes the normalized data set to generate a set of rules and relationships; and a data mining module that uses the set of rules and relationships to generate a mined data set from the selected data set, wherein the mined data set is used to characterize the packet-network-under-test.

16. The packet-network analyzer of claim 15, wherein the neural processing module comprises a fast neural classifier that is derived from ART.

17. The packet-network analyzer of claim 16, wherein the neural processing module further comprises a rules and relationship extraction module that uses a modified CHAID scheme.

18. The packet-network analyzer system of claim 15, wherein the neural processing module processes the normalized data set using ART, and the set of rules and relationships is generated by the neural processing module using a modified CHAID scheme.

19. The packet-network analyzer system of claim 18, wherein the first client analyzer uses XML to transport the raw digital data of the packet-network-under-test to the data collection element.

20. The packet-network analyzer system of claim 19, wherein the packet-network-under-test is an IP network.

21. The packet-network analyzer system of claim 20, wherein the host analyzer is communicatively coupled to a second client analyzer that is communicatively coupled via a packet network to a third client analyzer, and wherein the third client analyzer uses XML over HTTP to transmit raw digital data to the second client analyzer for characterizing a second packet-network-under-test that is connected to the third client analyzer.

22. The packet-network analyzer system of claim 19, wherein the packet-network-under-test is a subnet of the Internet.

23. The packet-network analyzer system of claim 15, wherein the data collection element of the host analyzer comprises a HTTP server using XML to communicatively couple the host analyzer via a packet network to the first client analyzer, and wherein the first client analyzer uses XML to transport the raw digital data of the packet-network-under-test to the host analyzer.

* * * * *